Nov. 23, 1965     E. J. HUNTER     3,219,061

SELECTOR VALVE FOR AUTOMATIC SPRINKLERS

Filed March 29, 1963     2 Sheets-Sheet 1

INVENTOR.
EDWIN J. HUNTER
BY
ATTORNEYS

Nov. 23, 1965  E. J. HUNTER  3,219,061
SELECTOR VALVE FOR AUTOMATIC SPRINKLERS
Filed March 29, 1963  2 Sheets-Sheet 2
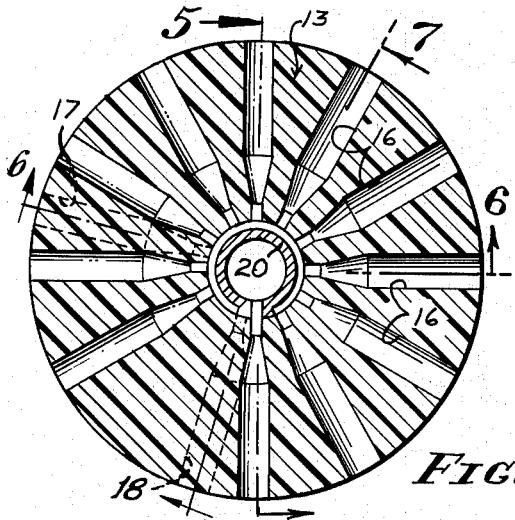
FIG. 4
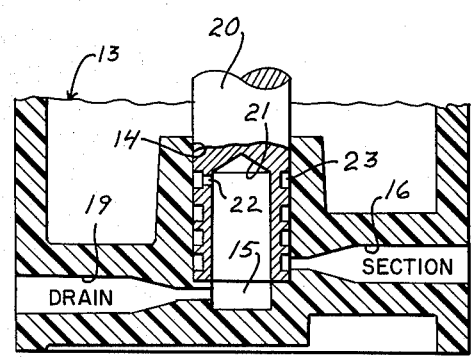
FIG. 5
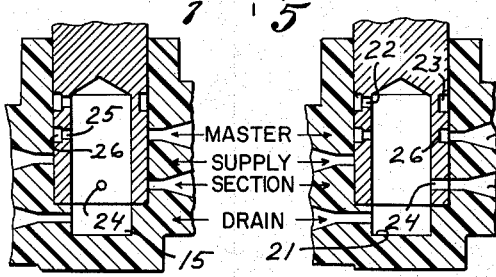
FIG. 8 OFF   FIG. 9 ON
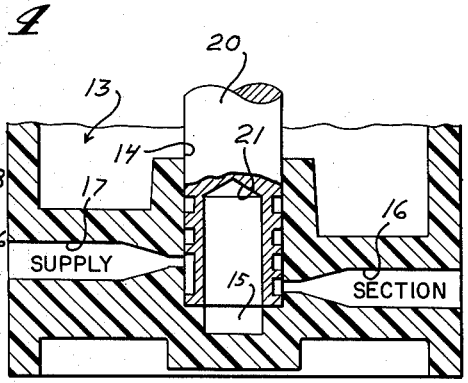
FIG. 6
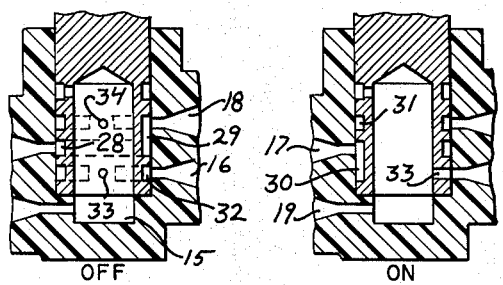
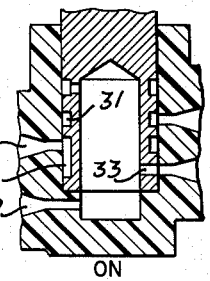
FIG. 10 OFF   FIG. 11 ON
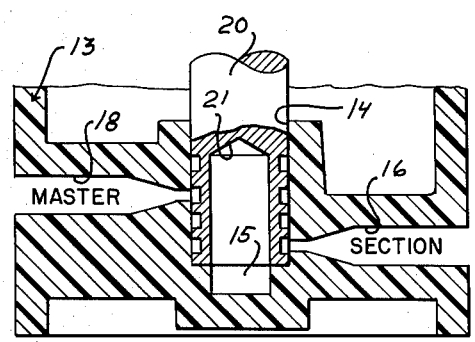
FIG. 7
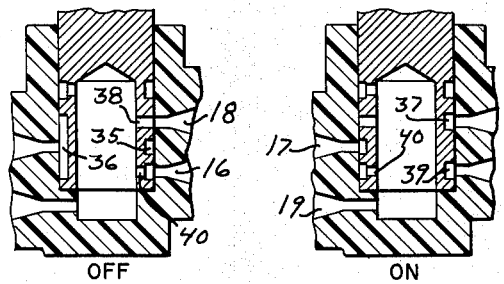
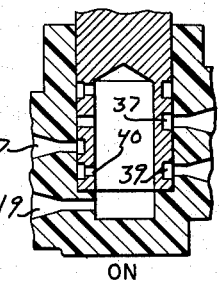
FIG. 12 OFF   FIG. 13 ON
INVENTOR.
EDWIN J. HUNTER
BY Lyon & Lyon
ATTORNEYS

United States Patent Office 3,219,061
Patented Nov. 23, 1965

3,219,061
SELECTOR VALVE FOR AUTOMATIC SPRINKLERS
Edwin J. Hunter, Riverside, Calif., assignor to Moist O'Matic, Inc., Riverside, Calif., a corporation of Minnesota
Filed Mar. 29, 1963, Ser. No. 269,057
1 Claim. (Cl. 137—625.11)

This invention relates to selector valves for automatic sprinklers, and is a continuation-in-part of my copending application for Automatic Control for Sprinklers, filed August 7, 1961, Serial No. 129,640, and now abandoned.

Included in the objects of this invention are:

First, to provide a particularly simple and compact selector valve structure having a minimum of parts, the valve body being molded of plastic material which readily forms a sealing connection with a central rotatable armature and permits a ring of closely related ports, so that the armature and the entire selector valve may be of minimum diameter.

Second, to provide a selector valve which is so arranged that by use of a single valve body and a set of valve armatures the selector valve may be adapted for use with any type of sprinkler system; that is, systems employing "pin" type or "pinless" type of remote control valves, or normally open or normally closed types of remote control valves.

With the above and other objects in view, as may appear hereinafter, reference is directed to the accompanying drawings in which:

FIGURE 4 is a further enlarged, transverse, sectional view of the selector valve taken principally through 4—4 of FIGURE 3;

FIGURES 5, 6, and 7 are fragmentary, transverse, sectional views thereof taken through 5—5, 6—6, and 7—7, respectively, of FIGURE 4;

FIGURES 8 and 9 are fragmentary, sectional views of the selector valve showing the selector shaft thereof as adapted for control of pin type, normally open, remote control valves;

FIGURES 10 and 11 are similar fragmentary, sectional views showing the selector shaft as adapted for pinless type, normally open, remote control valves;

FIGURES 12 and 13 are similar fragmentary sectional views showing the selector shaft as adapted for pinless type, normally closed, remote control valves.

The selector valve for automatic sprinklers is adapted to be used in conjunction with various types of sprinkler systems, that is, sprinkler systems having different types of remote control valves.

Figure 1:
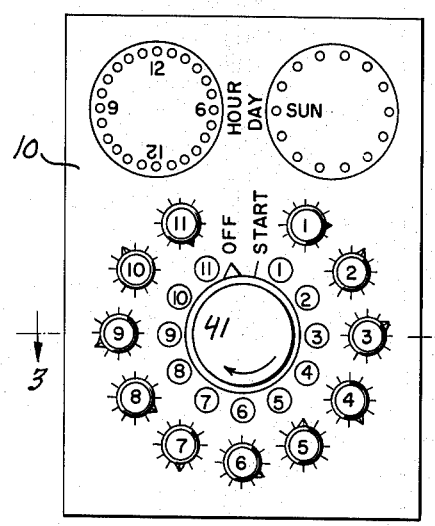
FIGURE 1 is a front view of an automatic control for sprinklers incorporating the selector valve.
Figure 2:
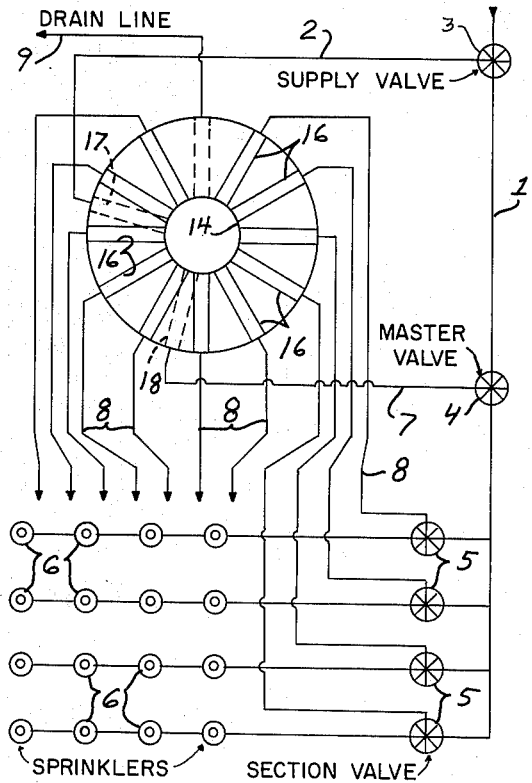
FIGURE 2 is a diagrammatical view showing the relationship of the selector valve to a sprinkler system.
Figure 3:
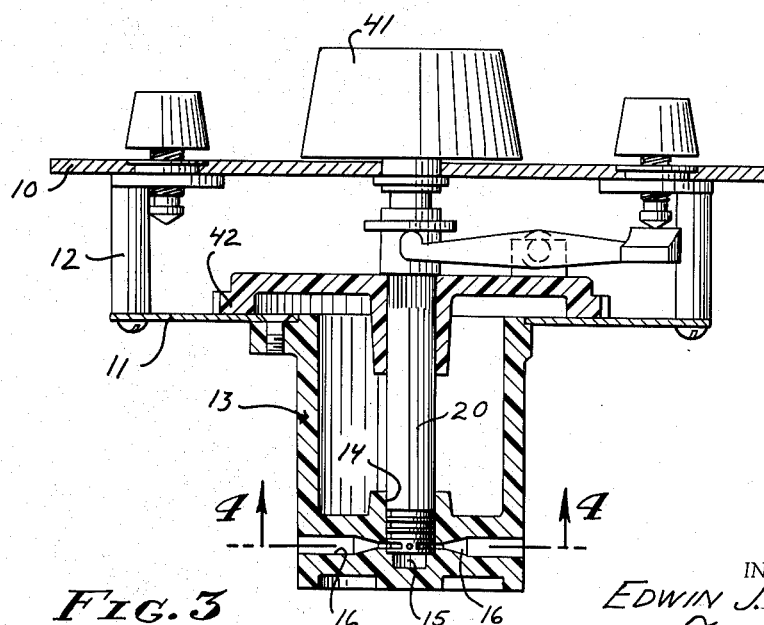
FIGURE 3 is an enlarged, fragmentarily, transverse, sectional view thereof taken through 3—3 of FIGURE 1 and showing the selector valve.

With reference to FIGURE 2. Typical sprinkler systems include a main supply line 1 from which extends a branch line 2 which may, if desired, be provided with a valve 3. Downstream of the branch line 2 is a master valve 4 which controls the entire sprinkler system. Downstream of the master valve 4 are branch lines, each of which is controlled by a sprinkler section valve 5. Each sprinkler section valve controls a group of sprinklers 6.

The master valve 4 and the sprinkler section valves 5 are of the remote control type. For example, they may be one of the types shown in Patent 2,980,385, issued April 18, 1961, entitled "Remote Control Valves."

Remote control valves, such as shown in the above-mentioned patent, have a control or pressure chamber which when pressurized forces a main valve element against its seat to close the valve. Pressure fluid for this pressure chamber may be obtained from the water supplied upstream of the valve through a small port in the valve itself. This type is known as the "pin" type and is usually a normally open valve; that is, the valve tends to remain open unless a control line leading from the pressure chamber is maintained closed. As will be brought out hereinafter, this control line is utilized by a selector valve forming a part of the control to open or close the remote control valve. Another type utilizes the control line to supply water to the pressure chamber or to bleed water therefrom.

If pressure must exist in the pressure chamber to close the valve, then it is designated a "normally open valve." If the pressure chamber is so related to the valve chamber that it must be pressurized to open the valve member, then the valve is known as a "normally closed," remote control valve.

It is customary to designate the valves which do not have a small orifice through the valve member as "pinless" type remote control valves. The term "pin" is derived from the fact that the pin type valve is provided with a pin or similar member which keeps the small orifice open for flow of water.

As will be brought out hereinafter, a control line or pilot line 7 is connected to the master valve 4, and similar lines 8 are connected to the sprinkler section valves 5. A drain line 9 is also provided. These lines are associated with the selector valve, as will be brought out hereinafter.

The automatic control in which the selector valve is incorporated includes a front panel 10 and a back panel 11 disposed in parallel relation by spacers 12. Supported from the back side of the back panel 11 is a selector valve body 13. The closed base of the valve body 13 is provided with a central bore 14 having a reduced inner end 15. The selector valve body 13 is essentially cup-shaped and formed of plastic material which is slightly yieldable, that is, has elastomeric properties. For example, the valve body 13 may be injection molded of a low-density polyethylene plastic; however, other materials such as eurethanes, Buna-N, or neoprene may be used.

The central bore 14 is intersected by a ring of section ports 16 which are adapted to be connected by the control or pilot lines 8 to the sprinkler section valves 5. The pilot lines may be formed of plastic tubing, the ends of which are inserted in the passages and cemented in place. Metal tubing of a diameter to be forced into the passages may also be used. In either case, no separate fastening means or screw threads are needed.

For purposes of illustration, eleven section ports 16 are indicated, located 30° apart so as to provide a blank space. The central bore 14 is also intersected at points axially offset from the section ports 16 by a supply port 17 and a master port 18. The master port 18 is connected by the control or pilot line 7 to the master valve 4. The supply port 17 is connected by the branch line 2 to the main sprinkler supply line.

The reduced inner end 15 is intersected by a drain port 19. The drain port 19 is connected to the drain line 9.

The central bore 14 receives a selector shaft 20 which is sealingly engaged by the walls of the central bore 14. The selector shaft 20 is formed of metal or other rigid material, and is provided with a socket 21 extending from its inner end, which is intersected by an aperture 22 which communicates with a drain groove 23 located at the opposite sides of the ports from the reduced inner end 15. The selector shaft 20 is provided with various other apertures and grooves so arranged as to adapt the selector valve for operation with the various types of remote control valves.

Reference is directed to FIGURES 8 and 9 in which the selector shaft 20 is shown as arranged to effect operation of pin type, normally open, remote control valves. For this purpose the supply branch line 2 is not used.

The selector shaft 20 is provided with a drain aperture 24 communicating with the socket 21 and arranged to be brought into registry with the section ports 16 in sequence as the selector shaft 20 is turned. The selector shaft is also provided with a drain aperture 25 which communicates with a partial groove 26 to provide a communication with the master port 18 for all positions of the selector shaft 20 except its "off" position.

The blank space between the ring of section ports 16 cooperates with the selector shaft 20 to form the "off" position of the selector valve. With this arrangement of the selector shaft 20, the "off" position is determined when water cannot bleed from the control or pilot lines 7 and 8. The "on" position is determined when water is permitted to bleed therefrom. The selector shaft 20 in rotating opens the master valve 4. While this valve remains open the selector shaft 20 opens and closes in sequence with the section valves 5, and then shuts off the master valve 4.

Reference is now directed to FIGURES 10 and 11. In this construction, the selector shaft 20 is provided with an annular groove 28 in the plane of the supply port and axial slots 29 and 30 extending to the planes of the master port 18 and section ports 16, respectively. The selector shaft 20 is also provided with partial grooves 31 and 32 in the planes of the master port 18 and section ports 16, respectively. The partial groove 31 does not intersect but terminates on opposite sides of the slot 29, whereas the partial groove 32 intersects the slot 30. The land between the ends of the partial groove 32 is intersected by a drain aperture 33, in the plane of the section ports 16. The groove 31 is intersected by a drain aperture 34.

In the "off" position of the selector shaft 20, arranged as shown in FIGURES 10 and 11, supply line pressure is applied to the master valve 4 through the master port 18, and supply line pressure is applied to all of the section valves 5 through section ports 16 so that the master valve and section valves are closed.

In running or "on" position, the master port 18 is connected through the partial groove 31 and drain port 34 with the drain line 9 so as to maintain the master valve 4 open. A selected section port is connected through the drain port 33 to the drain line 9 to open the corresponding section valve, but the remaining section ports remain connected to the supply port 17 so that the remaining section valves are held closed.

Reference is now directed to FIGURES 12 and 13. This arrangement of the selector shaft 20 is adapted for use in conjunction with remote control valves which are normally closed. That is, if these valves are connected to their respective control or pilot lines and these lines are connected to a drain line, the remote control valves will be closed.

The selector shaft 20 is provided with an annular groove 35 in the plane of the supply port 17. The annular groove 35 is intersected by an axial slot 36 extending to the planes of the section ports 16 and master port 18. In the plane of the master port 18 there is a partial groove 37 which intersects the slot 36. In the land between the ends of the partial groove 37 there is a drain aperture 38 for communication between the master port 18 and the socket 21.

The selector shaft 20 is also provided with a partial groove 39 in the plane of the section ports 16, which does not intersect the slot 36 but is intersected by a drain aperture 40. With this arrangement of the selector shaft 20, the master port 18 and all of the section ports 16 are connected to the drain line 9 through the drain port 19 so that the master valve 4 and section valves 5 are closed. In the "on" or running position, the supply line pressure is applied to the master valve 4 and to a selected one of the section valves.

The selector shaft 20 projects from the valve body 13 through the back panel 11 and front panel 10, and is provided with a manual control knob 41. Secured to the selector shaft 20, immediately above the back panel 11, is a selector shaft gear 42 of substantial diameter, which is rotated intermittently by a drive and control mechanism more fully disclosed in the companion application, Serial No. 129,640.

By reason of the fact that the valve body is constructed of a yieldable plastic material, only two parts, namely, the body and valve stem, are required even though the valve may have many parts and be used to control a complex sprinkler system. Also, the various lines connected with the selector valve may be of inexpensive plastic material, and cemented in place in the various radial passages in the valve body.

It will thus be seen that screw-threaded parts are completely eliminated, and the cost of manufacture is reduced to a minimum.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:

A selector valve for irrigation systems, comprising:

(a) a single-piece valve body formed of plastic material having elastomeric properties, said valve body defining an axially extending socket of uniform diameter, a ring of radiating service ports communicating with said socket and disposed in a common plane, a radial supply port, and a radial drain port, said supply and drain ports being axially displaced from each other and said service ports and communicating with said socket;

(b) a single-piece metal valve stem having a normal surface of uniform diameter fitting and forming with the surface of said socket a seal against axial and circumferential flow of fluid between said stem and body, said stem having a radial port therein and passage means leading from said radial port for communication between only one selected service port and said drain port, and a partial groove in the plane of said radial port extending circumferentially around said stem and of sufficient annular extent to communicate with at least all but one of said service ports and passage means leading therefrom at the outer surface of said stem for communication between all of the remaining service ports and said supply port, whereby on rotation of said valve stem said service ports are connected in sequence to said drain port and the remaining service ports are connected to said supply port.

References Cited by the Examiner

UNITED STATES PATENTS

| | | | |
|---|---|---|---|
| 2,314,428 | 3/1943 | Schouten | 137—625.11 X |
| 2,345,073 | 3/1944 | Rosett | 137—625.11 |
| 2,767,737 | 10/1956 | Turak | 251—368 X |
| 2,854,027 | 9/1958 | Kaiser et al. | 251—368 X |
| 3,098,506 | 7/1963 | Spragens | 137—625.47 X |
| 3,124,335 | 3/1964 | Mason | 251—368 X |

M. CARY NELSON, *Primary Examiner.*